United States Patent
McGhee et al.

(10) Patent No.: US 6,553,075 B1
(45) Date of Patent: Apr. 22, 2003

(54) METHOD AND APPARATUS FOR DETERMINING CROSSTALK

(75) Inventors: David W. McGhee, Austin, TX (US); James R. Sisk, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/228,686

(22) Filed: Jan. 12, 1999

(51) Int. Cl.⁷ ................................................ H04B 1/10
(52) U.S. Cl. .................... 375/254; 375/222; 375/225; 370/468; 379/1.03
(58) Field of Search .......................... 375/254, 219, 375/222, 224, 225, 227, 228, 295–296, 346; 370/252, 468, 480, 482; 379/1.03, 12, 22, 22.02, 22.04, 22.08, 23, 27.01, 27.03, 29.03, 32.01, 32.04

(56) References Cited

U.S. PATENT DOCUMENTS

| | | | |
|---|---|---|---|
| 3,532,827 A | 10/1970 | Ewin | 179/18 |
| 3,821,484 A | 6/1974 | Sternung et al. | 179/18 EB |
| 4,002,849 A | 1/1977 | Kotler et al. | 179/18 EB |
| 4,282,408 A | 8/1981 | Stauers | 179/18 FA |
| 4,438,511 A | 3/1984 | Baran | 370/19 |
| 4,665,514 A | 5/1987 | Ching et al. | 370/60 |
| 4,679,227 A | 7/1987 | Hughes-Hartogs | 379/98 |
| 4,731,816 A | 3/1988 | Hughes-Hartogs | 379/98 |
| 4,757,495 A | 7/1988 | Decker et al. | 370/76 |
| 4,782,512 A | 11/1988 | Hutton | 379/98 |
| 4,833,706 A | 5/1989 | Hughes-Hartogs | 379/98 |
| 4,841,561 A | 6/1989 | Hill | 379/98 |
| 4,949,355 A | 8/1990 | Dyke et al. | 375/10 |
| 4,980,897 A | 12/1990 | Decker et al. | 375/38 |
| 5,025,469 A | 6/1991 | Bingham | 379/98 |
| 5,054,034 A | 10/1991 | Hughes-Hartogs | 375/8 |
| 5,119,402 A | 6/1992 | Ginzburg et al. | 375/17 |

(List continued on next page.)

FOREIGN PATENT DOCUMENTS

| | | |
|---|---|---|
| JP | 62084646 | 4/1987 |
| JP | 62222755 | 9/1987 |
| JP | 6376648 | 4/1988 |
| JP | 02271763 | 11/1990 |
| JP | 04100367 | 4/1992 |
| WO | WO 86/02796 | 5/1986 |
| WO | WO 97/37458 | 10/1997 |

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

*Primary Examiner*—Chi Pham
*Assistant Examiner*—Khanh Cong Tran
(74) *Attorney, Agent, or Firm*—Baker Botts L.L.P.

(57) ABSTRACT

A system to analyze and compensate for noise on a transmission line (35) is provided. The system comprises a transmission card which includes a transceiver (32), and a microprocessor (34) attached to the transceiver (32). The system also comprises a transmission line (35) coupled to the transceiver (32) and at least one customer premise equipment (38) coupled to the transceiver (32) by the transmission line (35). The microprocessor (34) is operable to monitor the transmission line (32) and determine the signal-to-noise ratio on the line as a function of frequency, and adjust the rate of transmission in terms of bandwidth in terms of bits as a function of frequency.

8 Claims, 1 Drawing Sheet

U.S. PATENT DOCUMENTS

| | | | | |
|---|---|---|---|---|
| 5,134,611 | A | 7/1992 | Steinka et al. | 370/79 |
| 5,185,763 | A | 2/1993 | Krishnan | 375/39 |
| 5,198,818 | A | 3/1993 | Samueli et al. | 341/144 |
| 5,199,071 | A | 3/1993 | Abe et al. | 379/38 |
| 5,202,884 | A | 4/1993 | Close et al. | 370/94.1 |
| 5,206,886 | A | 4/1993 | Bingham | 375/97 |
| 5,214,650 | A | 5/1993 | Renner et al. | 370/110.1 |
| 5,222,077 | A | 6/1993 | Krishnan | 375/39 |
| 5,228,062 | A | 7/1993 | Bingham | 375/97 |
| 5,247,347 | A | 9/1993 | Litteral et al. | 358/85 |
| 5,282,155 | A | 1/1994 | Jones | 364/724.19 |
| 5,285,474 | A | 2/1994 | Chow et al. | 375/13 |
| 5,293,402 | A | 3/1994 | Crespo et al. | 375/14 |
| 5,295,159 | A | 3/1994 | Kerpez | 375/38 |
| 5,331,670 | A | 7/1994 | Sorbara et al. | 375/111 |
| 5,337,348 | A | 8/1994 | Yamazaki et al. | 379/94 |
| 5,339,355 | A | 8/1994 | Mori et al. | 379/94 |
| 5,341,474 | A | 8/1994 | Gelman et al. | 395/200 |
| 5,345,437 | A | 9/1994 | Ogawa | 370/13 |
| 5,367,540 | A | 11/1994 | Kakuishi et al. | 375/103 |
| 5,371,532 | A | 12/1994 | Gelman et al. | 348/7 |
| 5,379,441 | A | 1/1995 | Watanabe et al. | 395/800 |
| 5,390,239 | A | 2/1995 | Morris et al. | 379/93 |
| 5,400,322 | A | 3/1995 | Hunt et al. | 370/19 |
| 5,404,388 | A | 4/1995 | Eu | 379/24 |
| 5,408,260 | A | 4/1995 | Arnon | 348/6 |
| 5,408,522 | A | 4/1995 | Ikehata et al. | 379/98 |
| 5,408,614 | A | 4/1995 | Thornton et al. | 395/275 |
| 5,410,264 | A | 4/1995 | Lechleider | 327/311 |
| 5,410,343 | A | 4/1995 | Coddington et al. | 348/7 |
| 5,414,455 | A | 5/1995 | Hooper et al. | 348/7 |
| 5,414,733 | A | 5/1995 | Turner | 375/233 |
| 5,422,876 | A | 6/1995 | Turudic | 370/15 |
| 5,428,608 | A | 6/1995 | Freeman et al. | 370/60.1 |
| 5,430,793 | A | 7/1995 | Ueltzen et al. | 379/93 |
| 5,440,335 | A | 8/1995 | Beveridge | 348/13 |
| 5,442,390 | A | 8/1995 | Hooper et al. | 348/7 |
| 5,453,779 | A | 9/1995 | Dan et al. | 348/7 |
| 5,461,415 | A | 10/1995 | Wolf et al. | 348/7 |
| 5,461,616 | A | 10/1995 | Suzuki | 370/79 |
| 5,461,640 | A | 10/1995 | Gatherer | 375/231 |
| 5,469,495 | A | 11/1995 | Beveridge | 379/56 |
| 5,475,735 | A | 12/1995 | Williams et al. | 379/59 |
| 5,477,263 | A | 12/1995 | O'Callaghan et al. | 348/7 |
| 5,479,447 | A | 12/1995 | Chow et al. | 375/260 |
| 5,495,483 | A | 2/1996 | Grube et al. | 370/95.1 |
| 5,504,736 | A | 4/1996 | Cubbison, Jr. | 370/13 |
| 5,504,753 | A | 4/1996 | Renger et al. | 371/20.1 |
| 5,506,868 | A | 4/1996 | Cox et al. | 375/222 |
| 5,513,251 | A | 4/1996 | Rochkind et al. | 379/93 |
| 5,528,585 | A | 6/1996 | Cooley et al. | 370/56 |
| 5,546,379 | A | 8/1996 | Thaweethai et al. | 370/17 |
| 5,555,244 | A | 9/1996 | Gupta et al. | 370/60.1 |
| 5,574,724 | A | 11/1996 | Bales et al. | 370/68.1 |
| 5,583,872 | A | 12/1996 | Albrecht et al. | 370/476 |
| 5,598,406 | A | 1/1997 | Albrecht et al. | 370/296 |
| 5,600,712 | A | 2/1997 | Hanson et al. | 379/142 |
| 5,602,902 | A | 2/1997 | Satterlund et al. | 379/59 |
| 5,631,897 | A | 5/1997 | Pacheco et al. | 370/237 |
| 5,649,001 | A | 7/1997 | Thomas et al. | 379/93.07 |
| 5,668,857 | A | 9/1997 | McHale | 379/93.07 |
| 5,678,004 | A | 10/1997 | Thaweethai | 595/187.01 |
| 5,687,176 | A | 11/1997 | Wisniewski et al. | 370/476 |
| 5,737,364 | A | 4/1998 | Cohen et al. | 375/220 |
| 5,756,280 | A | 5/1998 | Soora et al. | 455/4.2 |
| 5,770,950 | A | 6/1998 | Zurcher et al. | 326/30 |
| 5,781,617 | A | 7/1998 | McHale et al. | 379/93.14 |
| 5,799,017 | A | 8/1998 | Gupta et al. | 370/419 |
| 5,812,786 | A | 9/1998 | Seazholtz et al. | 395/200.63 |
| 5,852,655 | A | 12/1998 | McHale et al. | 379/93.14 |
| 5,991,337 | A * | 11/1999 | Giles | 375/222 |
| 6,058,162 | A * | 5/2000 | Nelson et al. | 379/22.03 |
| 6,122,247 | A * | 9/2000 | Levin et al. | 370/210 |
| 6,154,524 | A * | 11/2000 | Bremer | 379/10.03 |
| 6,259,746 | B1 * | 7/2001 | Levin et al. | 370/468 |
| 6,275,522 | B1 * | 8/2001 | Johnson et al. | 370/252 |

\* cited by examiner

METHOD AND APPARATUS FOR DETERMINING CROSSTALK

TECHNICAL FIELD OF THE INVENTION

This invention relates to the field of telecommunications and more specifically to a method and apparatus for determining crosstalk.

BACKGROUND OF THE INVENTION

As demand for broadband services, such as high speed Internet access and on-demand video to the home increases, the need for technologies that can transmit large bandwidth of information also increases.

One technology being introduced to fill this need is digital subscriber lines (xDSL). The advantage of xDSL over other broadband technologies such as fiber optics to the home or cable modems is that it uses the existing twisted pair copper lines that already provide telephone services to homes to provide high bandwidth transmissions.

The term xDSL is a catchall term covering a number of similar technologies. These include High bit rate Digital Subscriber Line (HDSL) and Asymmetric Digital Subscriber Line (ADSL).

HDSL is designed to deliver T1 (1.544 Mbps) and E1 (2.048 Mbps) services over unconditioned copper lines by using transceivers on each end of two or three twisted pairs. Single pair HDSL is typically limited to 384 Kbps or 768 Kbps symmetrical speeds.

ADSL also uses twisted pairs of copper lines to provide a large downstream path and a smaller upstream path. This allows for services such as on demand video and high speed Internet access where the user needs to receive greater bandwidth than the user needs to send. In one embodiment, ADSL is capable of providing downstream rates in excess of 6 Mbps and simultaneous duplex transmissions of 640 Kbps. Several competing ADSL standards exist. These include Discrete Multitone (DMT) and carrierless Amplitude and Phase modulation (CAP). In one embodiment, DMT divides the 1 MHZ phone line spectrum into 256 4 KHz channels. Bit density can be varied to overcome noise and interference.

CAP uses a single carrier and utilizes amplitude modulation similar to that used for modems.

Both DMT and CAP operate by placing an ADSL modem on either end of a twisted-pair telephone line (one at a central office and the other at the customer's home or office). Three channels are created: a POTS (plain old telephone service) channel, a medium speed duplex channel and a high speed downstream channel. In a typical implementation, POTS takes up the first 4 KHz of the phone line spectrum. The medium speed duplex channel and the high speed downstream channel occupy higher frequencies in the spectrum. Since the POTS channel is located in the first 4 KHz of the spectrum it can be split off from the data channels by filtering, thus providing an uninterrupted POTS connection.

The phone lines that ADSL is provided on are regular twisted pair lines. These are often provided as approximately 25 lines in the same bundle. When the lines are close together, crosstalk can occur. Crosstalk is caused by the signal in one line causing noise in another. The noisier the line, the lower the possible transmission rate across the line. To help fix this problem, margin, measured in terms of decibels, is used to pad the transmission rate. The margin is currently based on white noise or flat noise. For example, if a receiver requires a 25 dB signal to noise ratio (SNR) for acceptable transmission at a rate, that required SNR number is increased by 1 dB to give 1 dB of margin. However, if the noise induced on the line is not white noise (which it rarely is), the margin would be higher than necessary which, in effect, artificially reduces the bandwidth for transmission.

SUMMARY OF THE INVENTION

Accordingly, a need has arisen for a method and apparatus for determining and compensating for crosstalk. The present invention includes a method and apparatus for determining and compensating for crosstalk that addresses the shortcoming of prior systems and methods.

According to one embodiment of the invention, a system to analyze and compensate for noise on a transmission line is provided. The system comprises a transmission card which includes a transceiver, and a microprocessor attached to the transceiver. The system also comprises a transmission line coupled to the transceiver and at least one customer premise equipment coupled to the transceiver by the transmission line. The microprocessor is operable to monitor the transmission line to provide a margin between the noise on the line and a transmitted signal The present invention provides various technical advantages. Noise can be detected on an ADSL line and transmission adjusted according to the noise measured and to the type of noise expected in the future. Other technical advantages may be readily apparent to one skilled in the art from the following figures, descriptions and claims.

BRIEF DESCRIPTION OF THE DRAWINGS

For a more complete understanding of the present invention and advantages thereof, reference is now made to the following descriptions taken in conjunction with the following drawings, in which like numbers represent like parts, in which.

DETAILED DESCRIPTION OF THE INVENTION

Figure 1A:
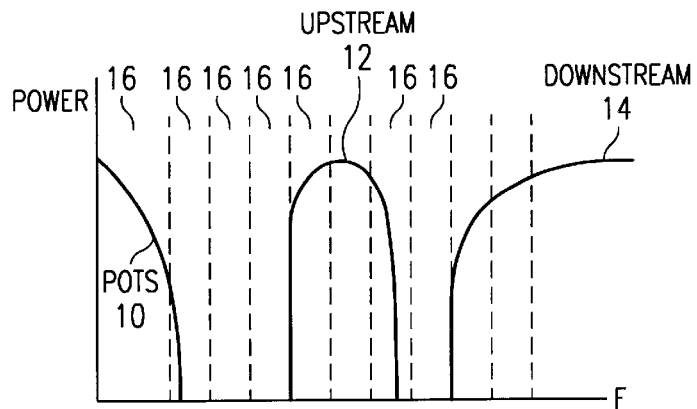
FIG. 1A illustrates an exemplary ADSL signal and FIG. 1B illustrates exemplary noise on a line with respect to frequency.
Figure 1B:
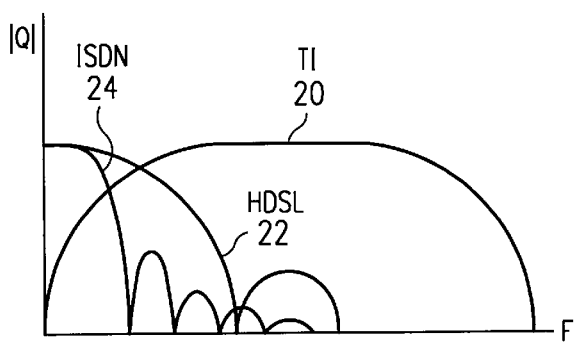
Figure 2:
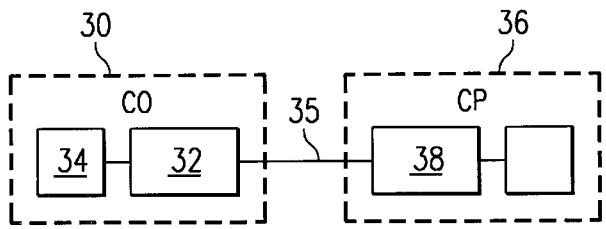
FIG. 2 illustrates an exemplary system for detecting crosstalk.
Figure 3:
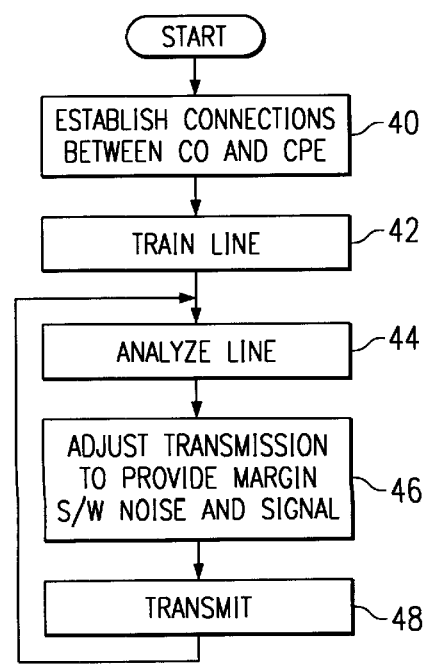
FIG. 3 illustrates a flowchart outlining the operation of the present invention.

Embodiments of the present invention and its advantages are best understood by referring to FIGS. 1 through 3 of the drawings, like numerals being used for like and corresponding parts of the various drawings.

FIG. 1A illustrates an exemplary ADSL signal. Illustrated in FIG. 1A is a POTS channel 10, an upstream 12 and a downstream channel 14. In a typical embodiment, POTS channel 10 occupies the first 4 KHz of the spectrum. Also in a typical embodiment, upstream channel 12 occupies a second area of the spectrum and has a bandwidth on the order of 640 kilobits per second. In one embodiment, downstream channel 14 can have a bandwidth in excess of 6 million bits per second. In a discreet multi-tone (DMT) ADSL system the full 1 MHZ spectrum offered by a phone line is divided into an equal number of channels. In one scheme, the spectrum is divided into two hundred fifty six 4 khz channels. Each separate channel is known as a bin. Illustrated in FIG. 1A are a number of bins 16. The advantage of discreet multi-tone ADSL is that the bit density in each of these bins can be varied depending on the amount of noise or interference in each bin. Noise and interference may come from many different sources.

A major source of noise on a line is crosstalk noise. Crosstalk noise can occur when a number of different ADSL copper lines are closely contained in a single bundle. For example, 25 different ADSL copper lines can be contained in a single bundle. A signal from one line can interfere with the signal in another line. Also, a bundle may contain an ISDN line. The ISDN line can cause interference in an ADSL line. A T1 or other lines can cause interference in an ADSL line. It is important to know what noise and interference are occurring on a particular line in a bundle in order to adjust for the noise. Additionally if the noise is too great for a given line, that line may not be used at all.

FIG. 1B illustrates exemplary noise with respect to frequency. As can be seen in FIG. 1B, one source can be noise from a T1 line 20 which usually is a large noise over almost the entire spectrum of the phone line. Somewhat less powerful noises might include xDSL noise 22 (from other xDSL lines such as HDSL or ADSL lines). Finally, ISDN 24 is of lower power but starts high and decreases in intensity as it spreads throughout the entire spectrum of the phone line. These illustrations reveal just three types of prevalent noise, but demonstrate that the type of noise can greatly affect the rate at which the ADSL can transmit data.

Illustrated in FIG. 2 is an exemplary system to determine cross talk noise in an ADSL line. Illustrated is a central office 30 where a number of ADSL lines are initiated. For each ADSL line is associated with a transceiver 32 and a microprocessor 34 for controlling the transceiver. Twisted copper pair 35 exists between the central office 30 and the customer premise 36. Twisted copper pair line 35 would terminate at customer premise 36 at an ADSL modem 38 (or similar equipment). Microprocessor 34 may include one or more microprocessors and may include one or more digital signal processors, analog to digital converters, as well as other equipment capable of monitoring analog signals on copper line 35 and then providing signal analysis. Microprocessor 34 can also be monitored by equipment in central office 30 in order to determine signal conditions a line.

When a connection is made between transceiver 32 and ADSL modem 38 in customer premise 36 in the present invention, microprocessor 34 begins to monitor the line. Microprocessor 34 is able to determine the amount of noise occurring on that line 35 by determining the signal-to-noise ratio in each bin in the case of DMT ADSL and by monitoring the signal-to-noise ratio and gain in the case of CAP ADSL.

Sometimes it is already known what the worst case scenario for noise on a line is. This margin is to allow for the worst case noise to come up after a modem has trained on a low noise line. If however, the worst case noise is already on the line when the modem trains, it will add margin on top of that which, in effect, counts the margin twice. (Once for the real noise, and once for the margin.) By detecting the exact source and amount of noise on a line, the margin can be changed to compensate for varying conditions. Avoiding this "doubling" of margin and maximizing transmitted bandwidth.

To avoid this wasted bandwidth, the signal-to-noise ratio can be computed for each of the bin (DMT ADSL) and the noise type and intensity could be reported to a management system. Then, in a manual implementation of this invention, the deployer of ADSL services or equipment would adjust transmission (or margin) in each bin to compensate for the noise based on his knowledge of the environment that the ADSL is being used in. The same applies to CAP ADSL, but the adjustments are based off of gain and signal to noise ratio.

This process could also be automated. For instance, in the case of DMT ADSL, once it is determined what the signal-to-noise ratio per bin is, the transceiver can determine what noise type and intensity is on the line. This knowledge coupled with the expected "worst case" information provided by the deployer of the system determines what margin the microprocessor will require the transceiver to add.

In the case of CAP ADSL, the signal-to-noise ratio and the gain is used in determining the noise type and intensity. Then an appropriate margin can be set and efficient transmission can occur.

FIG. 3 illustrates a flow chart outlining the operation of the present invention. In step 40, a connection is established between a transceiver 32 in central office 30 and ADSL modem 38 in customer premise 36. This connection exists over a twisted copper pair line. In the next step 42, the line is trained initially at a low rate. This means transmissions may begin on the line from the central office to the customer premises equipment, however it is done at a low bandwidth rate. In step 44, microprocessor 34 begins to analyze the line. The line is analyzed for line noise that can occur via crosstalk between other ADSL lines, other DSL lines, ISDN lines, or any other type of crosstalk that might occur in a bundle of lines. Also, the gain of the signal can be determined by microprocessor 34.

In the case of DMT ADSL systems, the signal-to-noise ratio in a bin can also be determined. In the case of CAP ADSL systems, gain and signal-to-noise ratio over the frequency can be determined. In either case, if a worst case provisioning scenario is known, the margin can be based on what is detected on the line with respect to the worst case scenario, thus maximizing transmitted bandwidth.

Microprocessor 34 takes all of this information to determine the best transmission rate. In step 46, transmission is then adjusted by a margin between the detected noise and expected worse case noise. This noise can also include a padding factor required by the particular supplier of the xDSL system such as a regional Bell operating company or (RBOC). Additionally, predefined rules could also cause a line to stop transmitting if too high a signal-to-noise ratio is indicated, such as interference from a T1 line in the particular bundle. In that case a new bundle might be chosen where no T1 line exists and transmission can occur without an undue amount of noise. After transmission is adjusted for the signal-to-noise ratio per bin, then in step 48 data is transmitted from the central office to the customer presence. This process continues as indicated by loop 50 until customer premise equipment such as ADSL modem 38 disconnects the connection between it and the central office. When a new connection is established, the flow would start over as step 40.

Although the present invention has been described in terms of an asynchronous digital subscriber line or ADSL, in reality any type of digital signal line or other types of transmissions that use margins in padding to cope with noise in a line may be used. And although the present invention utilizes the DSP features present in most DSL modems, a separate and generic DSP could be used to make the same noise measurements.

Although the present invention has been describe in detail, it should be understood that various changes, substitutions and alterations can be made thereto without depart-

What is claimed is:

1. A method for determining noise on a transmission line comprises of the steps of training the line at a low bandwidth rate;

analyzing the line using a microprocessor in order to determine noise as a function of frequency; and adjusting the transmission rate based on the determined noise and an expected worst case level of noise for a transmitted signal to provide a margin between the noise on the line and the transmitted signal, wherein the transmit signal is transmitted using a CAP ADSL scheme and noise is determined as a combined gain and signal-to-noise ratio value.

2. The method of claim 1, wherein the noise detection is done by a digital signal processor.

3. A system to analyze and compensate for noise on a transmission line comprising:

a transmission card including:
a transceiver; and
a microprocessor attached to the transceiver;
a transmission line coupled to the transceiver; and,
at least one customer premise equipment coupled to the transceiver by the transmission line;
wherein the microprocessor is operable to monitor the transmission line and determine noise on the line as a function of frequency, and adjust the rate of transmission based on the determined noise and an expected worst case level of noise for a transmitted signal transmission to provide a margin between the noise and a transmitted signal, wherein the transmission is transmitted using a CAP ADSL scheme and noise is determined as a combined gain and signal-to-noise ratio value.

4. The system of claim 3, wherein the microprocessor is a digital signal processor.

5. A method for determining noise on a transmission line comprises of the steps of:

training the line at a low bandwidth rate;

analyzing the line using a microprocessor in order to determine noise as a function of frequency; and adjusting the transmission rate to provide a margin between the noise on the line and the transmitted signal, wherein the transmit signal is transmitted using a CAP ADSL scheme and noise is determined as a combined gain and signal-to-noise ratio value.

6. The method of claim 5, wherein the noise detection is done by a digital signal processor.

7. A system to analyze and compensate for noise on a transmission line comprising:

a transmission card including:
a transceiver; and
a microprocessor attached to the transceiver;
a transmission line coupled to the transceiver; and,
at least one customer premise equipment coupled to the transceiver by the transmission line;
wherein the microprocessor is operable to monitor the transmission line and determine noise on the line as a function of frequency, and adjust the rate of transmission to provide a margin between the noise and a transmitted signal, wherein the transmission is transmitted using a CAP ADSL scheme and noise is determined as a combined gain and signal-to-noise ratio value.

8. The system of claim 7, wherein the microprocessor is a digital signal processor.

* * * * *